(12) United States Patent
Kulas

(10) Patent No.: US 8,655,416 B2
(45) Date of Patent: Feb. 18, 2014

(54) USER INTERFACE FOR A PORTABLE DEVICE INCLUDING DETECTING CLOSE PROXIMITY OF AN EAR TO ALLOW CONTROL OF AN AUDIO APPLICATION WITH A TOUCHSCREEN

(71) Applicant: Charles J. Kulas, San Francisco, CA (US)

(72) Inventor: Charles J. Kulas, San Francisco, CA (US)

(*) Notice: Subject to any disclaimer, the term of this patent is extended or adjusted under 35 U.S.C. 154(b) by 0 days.

(21) Appl. No.: 13/691,339

(22) Filed: Nov. 30, 2012

(65) Prior Publication Data

US 2013/0190055 A1     Jul. 25, 2013

Related U.S. Application Data

(60) Provisional application No. 61/590,284, filed on Jan. 24, 2012.

(51) Int. Cl.
*H04B 1/38*     (2006.01)
*H04M 1/00*     (2006.01)
*G06F 3/041*    (2006.01)
*G06F 3/045*    (2006.01)

(52) U.S. Cl.
USPC ......... 455/566; 455/556.1; 345/173; 345/174

(58) Field of Classification Search
USPC .................. 455/566, 556.1; 345/173, 174
See application file for complete search history.

(56) References Cited

U.S. PATENT DOCUMENTS

| | | | |
|---|---|---|---|
| 8,131,322 B2 * | 3/2012 | Sethuraman et al. | 455/569.1 |
| 2006/0128442 A1 * | 6/2006 | Cho | 455/569.1 |
| 2008/0137883 A1 * | 6/2008 | Araki | 381/107 |
| 2008/0297483 A1 * | 12/2008 | Kim et al. | 345/173 |
| 2009/0197635 A1 * | 8/2009 | Kim et al. | 455/550.1 |
| 2010/0291861 A1 * | 11/2010 | Anzures et al. | 455/3.01 |
| 2012/0105358 A1 * | 5/2012 | Momeyer et al. | 345/174 |
| 2012/0264460 A1 * | 10/2012 | Bush et al. | 455/457 |

OTHER PUBLICATIONS http://www.samsung.com/uk/consumer/mobile-devices/smartphones/android/GT-I9300MBDBTU-features.

* cited by examiner

*Primary Examiner* — Wesley Kim

(57) ABSTRACT

In a portable electronic device such as a mobile phone with a touchscreen display and a camera, if the camera detects that the user's ear is near the touchscreen (indicating that the user is using an audio application such as a phone call, radio player, music player, etc.) then the touchscreen can accept a touch or swipe from the user's ear, head, cheek or adjacent area. The adapted input can allow the user to control the audio application such as by swiping to change the volume, channel, song, etc.

20 Claims, 8 Drawing Sheets

USER INTERFACE FOR A PORTABLE DEVICE INCLUDING DETECTING CLOSE PROXIMITY OF AN EAR TO ALLOW CONTROL OF AN AUDIO APPLICATION WITH A TOUCHSCREEN

CROSS REFERENCES TO RELATED APPLICATIONS

This application claims priority from U.S. Provisional Patent Application Ser. No. 61/590,284; entitled "USER INTERFACE USING DEVICE AWARENESS", filed on Jan. 24, 2012, which is hereby incorporated by reference as if set forth in full in this document for all purposes.

BACKGROUND

Many conventional computing devices such as computers, tablets, game consoles, televisions, monitors, phones, etc., include a touchscreen. A touchscreen enables a user to interact directly with displayed objects on the touchscreen by touching the objects with a hand, finger, stylus, or other item. Such displayed objects may include controls that control functions on a phone. Using the touchscreen, the user can activate controls by touching corresponding objects on the touchscreen. For example, the user can touch an object such as a button on the touchscreen to activate a voice recognition application on the phone. The user can touch the touchscreen and swipe up and down to scroll a page up and down on the touchscreen.

The touchscreen display is typically controlled by a processor to dim or darken the screen after a brief period of time since the last touch in order to save power. For example, 10 seconds after the user has last touched the screen the screen may be dimmed or darkened completely. The display/touchscreen and other functionality of the phone can be turned off or put into a "hibernate" or "sleep" mode that uses less power. If the phone goes into a sleep mode, the user can "awaken" or fully activate the phone again by, for example, touching a button on the touchscreen or elsewhere on the device, or by performing a different action to reactivate the phone from sleep mode.

The various displayed objects on the touchscreen may be changed frequently as different application controls, operating system features, or other functions are provided to a user. So, for example, a set of controls may be displayed until the user selects a control. Then a new set of controls or a new page of information may be displayed so that the originally-displayed set of controls is no longer visible.

SUMMARY

In a portable electronic device such as a mobile phone with a touchscreen display and a camera, if the camera detects that the user's ear is near the touchscreen (indicating that the user is using an audio application such as a phone call, radio player, music player, etc.) then the touchscreen can accept a touch or swipe from the user's ear, head, cheek or adjacent area. The adapted input can allow the user to control the audio application such as by swiping to change the volume, channel, song, etc.

One embodiment provides a method comprising: detecting that an ear is in proximity to a portable electronic device; determining that an audio function is being executed on the portable electronic device; and accepting a signal from a touch screen on the portable electronic device to control the audio application.

DETAILED DESCRIPTION

Embodiments described herein enhance phone functionality based on detection of a finger of a user. As described in more detail below in connection with FIGS. 1, 2, and 3 in some embodiments, a phone checks if a finger is sufficiently close to the display screen of the phone prior to the phone initiating certain actions, such as activating a sleep mode, dimming the display screen, changing a graphical user interface, control buttons, or content on the display screen, etc. If an action such as going into sleep mode were to occur just before the user touches the display screen, the user would need to manually reactivate the phone in order to resume using the phone. A finger that is pointed toward and close to the display screen is indicative of the user intending to activate a control on the display screen. Accordingly, if the user's finger is close to the display screen, the phone will not perform certain actions. A portion of the user's face may also be detectable in the background by the camera and this can enable the system to further determine whether the user is about to try to activate a control.

As described in more detail below in connection with FIGS. 4 and 5, in some embodiments, a phone detects an activation of a control on a phone. The phone checks if a finger is within a predetermined distance from the display screen of the phone prior to the phone initiating the associated action (e.g., ending a phone call). If a finger is not within the predetermined distance from the display screen, it is likely that another part of the user such the user's cheek or ear inadvertently touched a button on the display screen. A finger that is close to the display screen is indicative of the user intending to activate a control on the display screen. Accordingly, if the activation of a control does not coincide with the presence of the user's finger in front of the display screen, the phone will not perform the action.

Some embodiments described herein enhance phone functionality based on detection of a mouth of a user. As described in more detail below in connection with FIGS. 6 and 7, in some embodiments, if a phone detects both a voice and mouth, the phone automatically activates a voice recognition application on a phone. In other words, if a user holds the phone up to the user's mouth and talks, the phone automatically interprets what the user is saying without the user needing to manually activate the voice recognition application.

Figure 1:
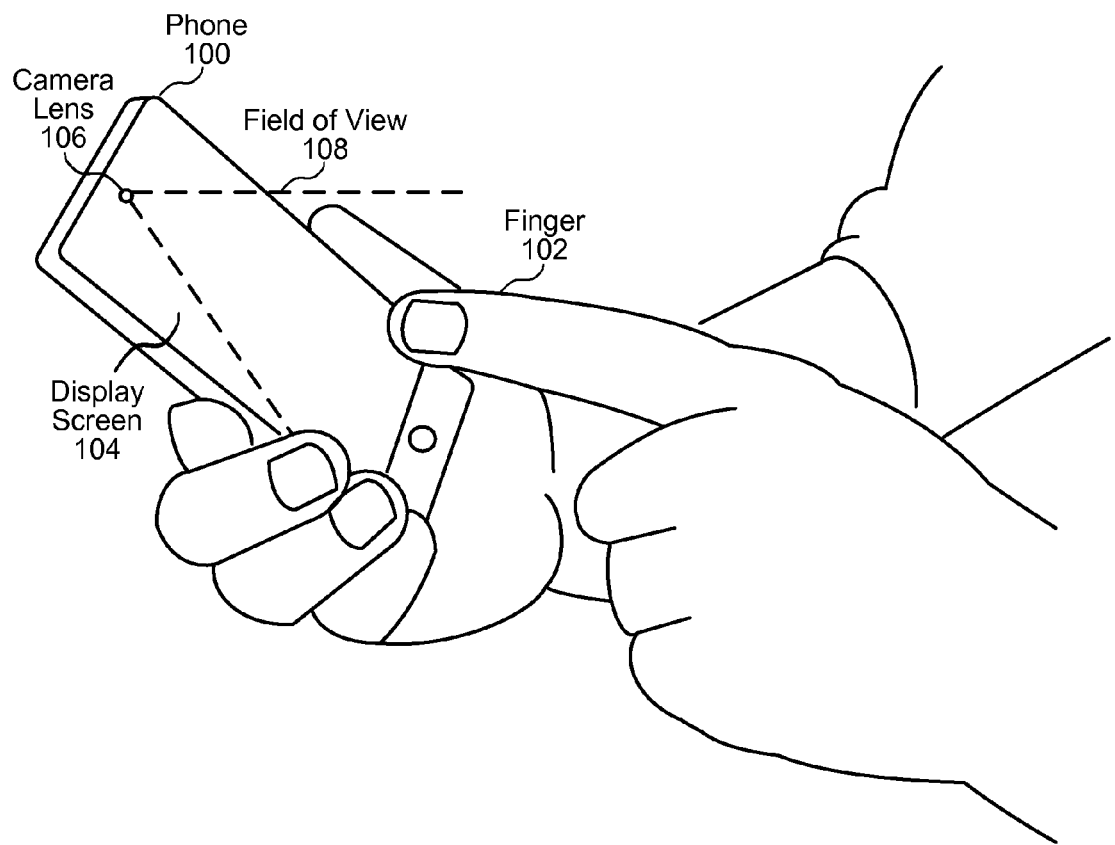
FIG. 1 illustrates a diagram of a phone configured to detect a finger of a user as the finger approaches the display screen of the phone, according to one embodiment.

FIG. 1 illustrates a diagram of a phone 100 configured to detect a finger 102 of a user as finger 102 approaches the display screen 104 of phone 100, according to one embodiment. In one embodiment, phone 100 also includes a camera that has a camera lens 106 configured to detect objects that are within a predetermined distance from display screen 104. In one embodiment, camera lens 106 has a field of view 108 that can detect finger 102 when it is within a close proximity (e.g., 0 to 3 inches, or more) to display screen 104.

In one embodiment, camera lens 106 may be a wide angle lens that can capture an object that is anywhere in front of display screen 104. In one embodiment, camera lens 106 may be a transparent cover over an existing camera lens, where camera lens 106 alters the optics to achieve a wider field of view and closer focus. As an overlay, camera lens 106 may be a film or button placed over an existing lens to alter the optics. In one embodiment, if camera lens 106 overlays an existing camera lens, phone 100 corrects any distortions to an image that may occur. Camera lens 106 may be permanently fixed to phone 100 or temporarily fixed to phone 100. In one embodiment, camera lens 106 may be a permanent auxiliary lens on phone 100, which may be used by an existing camera or a separate dedicated camera with the purpose of detecting a user finger.

While camera lens 106 is shown in the upper center portion of phone 100, camera lens 100 may be located anywhere on the face of phone 100.

In one embodiment, display screen 104 is a touchscreen, which enables the user to control phone 100 with finger 102. Note that while a finger is described in the example embodiments herein, embodiments may be applied to any object (e.g., stylus, pencil, pen, etc.) that may be used to operate a touchscreen. For example, phone 100 may detect a stylus, pencil, pen, etc, similarly to phone 100 detecting finger 102.

While camera lens 106 is shown in the upper center portion of phone 100, camera lens 106 may be located anywhere on the face of phone 100. Furthermore, while one lens 106 is shown, phone 100 may use multiple lenses for detection.

Figure 2:
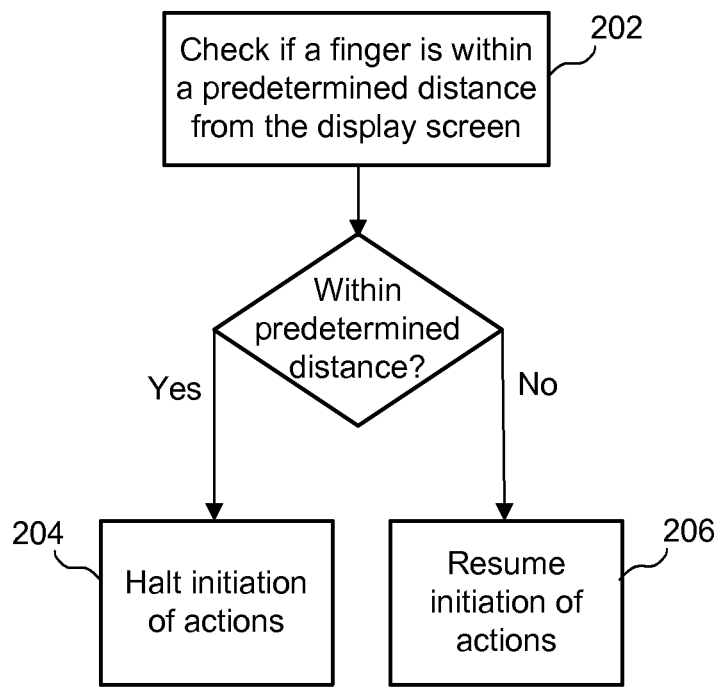
FIG. 2 illustrates an example simplified flow diagram for enhancing phone functionality based on detection of a finger of a user, according to one embodiment.

FIG. 2 illustrates an example simplified flow diagram for enhancing phone functionality based on detection of a finger of a user, according to one embodiment. Referring to both FIGS. 1 and 2, a method is initiated in block 202, where phone 100 checks if a finger 102 is within a predetermined distance from display screen 104 prior to phone 100 initiating one or more predetermined actions. In various embodiments, the predetermined actions may include activating a sleep mode on phone 100, dimming display screen 104, changing a graphical user interface on display screen 104, changing control buttons on display screen 104, changing content on display screen 104, etc.

In one embodiment, to check for finger 102, phone 100 takes a picture prior to phone 100 initiating the one or more predetermined actions. Phone 100 then determines if the picture includes finger 102. In one embodiment, if the picture includes finger 102, phone 100 then estimates if finger 102 is within the predetermined distance. In one embodiment, the predetermined distance (e.g., 0 to 3 inches, or more, etc.) is set to a default distance that is set at the factory. In one embodiment, the user may modify the predetermined distance. The user may also modify the field of view 108 angle.

In some embodiments, phone 100 may take multiple pictures and determine if a finger is in any of the pictures. In some embodiments, phone 100 may take a video and determine if a finger is in the video.

A finger that is close to display screen 104 is indicative of the user intending to activate a control on display screen 104. For example, if finger 102 is within 2 inches from display screen 104, the user probably intends to touch display screen 104 to activate a control. If an action such as going into sleep mode were to occur just before the user touches display screen 104, the user would need to manually reactivate the phone to in order to resume using the phone.

Figure 3:
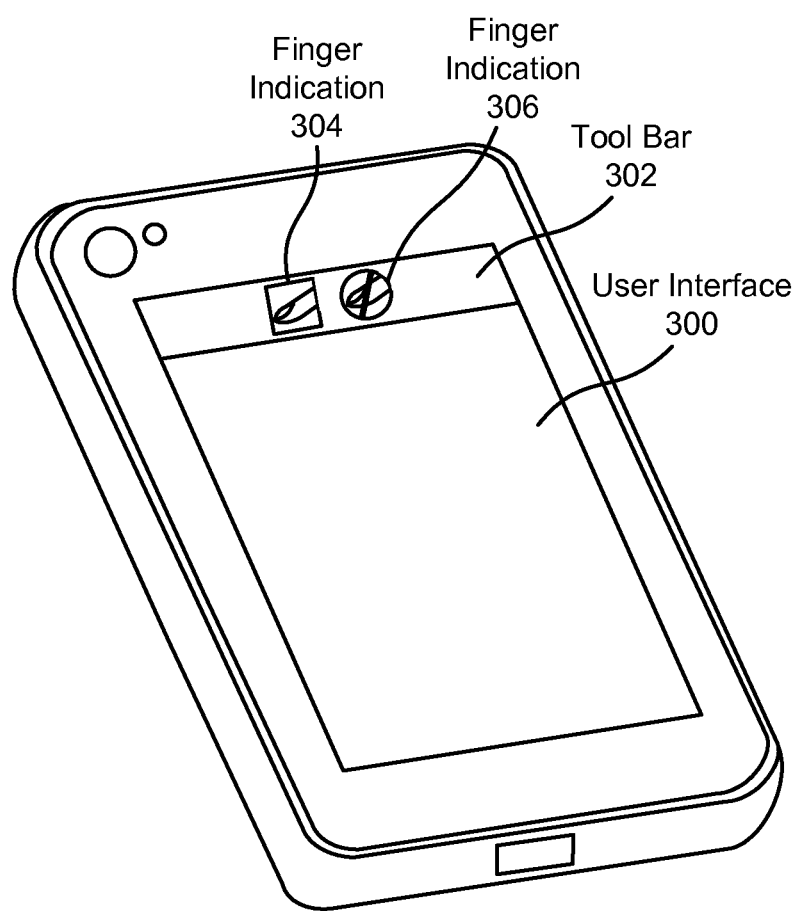
FIG. 3 illustrates an example user interface, according to one embodiment.

FIG. 3 illustrates an example user interface 300, according to one embodiment. As shown, user interface 300 may display a tool bar 302. In some embodiments, tool bar 302 may include finger indication 304 that indicates that a finger has been detected. In some embodiments, tool bar 302 may also include finger indication 306 that indicates that a button has being selected by an object other than a finger or a pointing device. For example, instead of a finger, a user's cheek may be inadvertently touching the display screen. Embodiments directed a display screen being touched by an object other than a finger or pointing device are described in more detail below in connection with FIGS. 4 and 5.

In some embodiments, when the user's finger hovers over a control button or link (without making actual contact with the display screen), phone 100 may initiate a hover function, similar to a mouse hover function. For example, when the user's finger hovers over a control button or link, phone 100 may display a description of the control button or link. If the user's finger is hovering over a link, phone 100 may display the uniform resource locator (URL) of the link. The phone 100 may display various types of information, depending on the particular implementation. In various embodiments, phone 100 may determine that the user's finger is hover when the user's finger is within a predetermined distance (e.g., within 2 inches) from display screen 104.

In block 204, phone 100 halts an initiation of the one or more predetermined actions if a finger is within the predetermined distance. In one embodiment, phone 100 deactivates or halts initiation of any action until the user initiates an action by touching a control on display screen 104. If finger 102 is not within the predetermined distance from display screen 104 (e.g., 7 inches, or otherwise not detectable in the picture), the user probably does not intend to touch display screen 104 to activate a control at that moment. In block 206, if a finger is not within the predetermined distance, phone 100 resumes the initiation of the one or more predetermined actions.

The following embodiment prevents a scenario where the user presses a button once to activate a control, but due to a delay in phone 100 performing the associated action (e.g., changing pages), the user attempts to repress the same button but inadvertently presses a different button on a subsequent page (where both of the buttons happen to be located in the same position on display screen 104). In one embodiment, if phone 100 detects activation of a control button by the touch of the user, phone 100 takes a picture to detect if a finger of the user is within a predetermined distance from display screen 104. In one embodiment, phone 100 takes the picture if phone 100 determines that phone 100 will delay performing the action associated with the activation of the control button more than a predetermined time period (e.g., 0.5 seconds, 1 second, etc.). This predetermined time period may be set to a default time period at the factory, but may also be reset or changed by the user. Phone 100 then determines from the picture if a finger is within the predetermined distance. If a finger is determined to be within the predetermined distance, phone 100 continues with the action, but halts performing a subsequent action associated with activation of a button on a subsequent page, where the button on the subsequent page is located in the same position on display screen 104 as the pressed button on the previous page. In one embodiment, if a finger is not determined to be within the predetermined distance, phone 100 continues with the action and does not halt performing a subsequent action associated with activation of a button on a subsequent page.

In one embodiment, the predetermined actions are provided by a default list that is set at the factory. In one embodiment, phone 100 enables a user to select the one or more predetermined actions from a predetermined list of actions. In one embodiment, phone 100 enables a user to override the halting of one or more predetermined actions.

Figure 4:
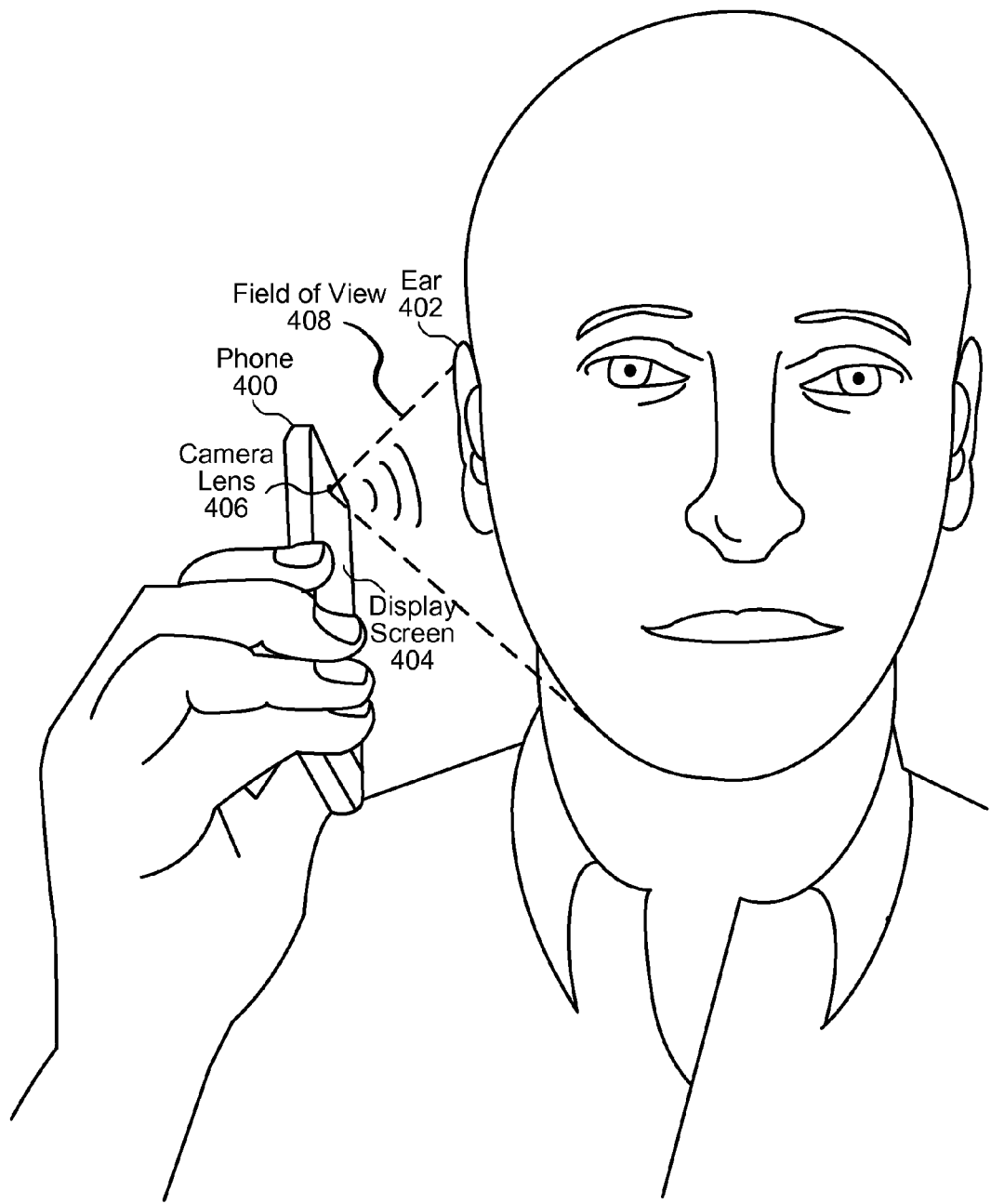
FIG. 4 illustrates a diagram of a phone next to an ear of a user, according to one embodiment.

FIG. 4 illustrates a diagram of a phone 400 next to an ear 402 of a user, according to one embodiment. Phone 400 also includes a display screen 404 and a camera lens 406 of a camera. In one embodiment, camera lens 406 is configured to detect and recognize an object such as an ear, finger, mouth, stylus, etc., that is within a predetermined distance from display screen 404. In one embodiment, camera lens 406 may be configured with a field of view 408 that can detect an object when the object is within a close proximity (e.g., 0 to 3 inches, or more) to display screen 404.

In the case where an ear is detected in close proximity to the phone it can be assumed that the user is trying to listen to the phone. If the phone is currently handling a phone call for the user then it can be assumed that the user is trying to listen to the call. In this case any controls on the phone meant to be activated by a finger, stylus, or other object can be disabled. The touch screen on the display can be advantageously used to increase the volume by detecting that the ear is being pressed harder against the touch screen as, for example, where the user is having difficulty hearing a voice or sound coming from the phone. Other ways to change the volume are possible such as by detecting a swipe in a predetermined direction (up-down, or side-to-side, etc.) so that the user can change the volume by swiping the phone against the user's ear.

Other types of "ear" controls are possible and they can vary depending on the audio application or audio function currently being used. For example, if a mobile phone is being used to play radio programs then an ear swipe (or swipe or touch by any other part of the body near the ear such as the head, cheek, etc.) can be used to change the program or channel. For a music player, a swipe can be used to change the song, album, artist, etc. The ear touch or swipe can be used to hang up the phone or end or mute the audio application. Other functions are possible.

It is not necessary to actually detect an ear while the user commands are being given by swiping or touching with an ear. The phone may have determined that the user has placed the phone against an ear by noting that the phone is being raised or manipulated (e.g., with the accelerometers, compass, or other sensors) and when the camera detects darkness or an unrecognizable shape in close proximity (e.g., the user's head or hair) then it can be assumed that the user is holding the phone to an ear. It may also be possible that the camera can do an image recognition of the side of a head or of a close-up of hair by using ambient light or by using light from the camera's flash or light-emitting diode (LED) designed to be used for camera images, or even from the light from the display screen reflecting or illuminating part of the head or hair. Other variations are possible.

In one embodiment, camera lens 406 may be a wide angle lens that can capture an object that is anywhere in front of display screen 404. In one embodiment, camera lens 406 may be a transparent cover over an existing camera lens, where camera lens 406 alters the optics to achieve a wider field of view and closer focus. As an overlay, camera lens 406 may be a film or button placed over an existing lens to alter the optics. In one embodiment, if camera lens 406 overlays an existing camera lens, phone 400 corrects any distortions to an image that may occur. Camera lens 406 may be permanently fixed to phone 400 or temporarily fixed to phone 400. In one embodiment, camera lens 406 may be a permanent auxiliary lens on phone 400, which may be used by an existing camera or a separate dedicated camera with the purpose of detecting a user finger.

While camera lens 406 is shown in the upper center portion of phone 400, camera lens 400 may be located anywhere on the face of phone 400.

In one embodiment, display screen 404 is a touchscreen, which enables the user to control phone 400 with a finger, hand, or other body part. For ease of illustration, phone 400 is show next to ear 402 of the user as phone 400 approaches ear 402, and is not yet touching the user's cheek or ear in order to more clearly illustrate portions of phone 400. As described in more detail below, if and when phone 400 makes contact with the user's cheek or ear, it is possible for the cheek or ear to inadvertently activate a control on display screen 404. Embodiments described herein address this potential problem.

Note that while a finger is described in the example embodiments herein, embodiments may be applied to any object that may be used to operate a touchscreen. For example, phone 400 may detect a stylus, pencil, pen, etc, similarly to phone 400 detecting a finger.

While camera lens 406 is shown in the upper center portion of phone 400, camera lens 406 may be located anywhere on the face of phone 400. Furthermore, while one lens 406 is shown, phone 400 may use multiple lenses for detection.

Figure 5:
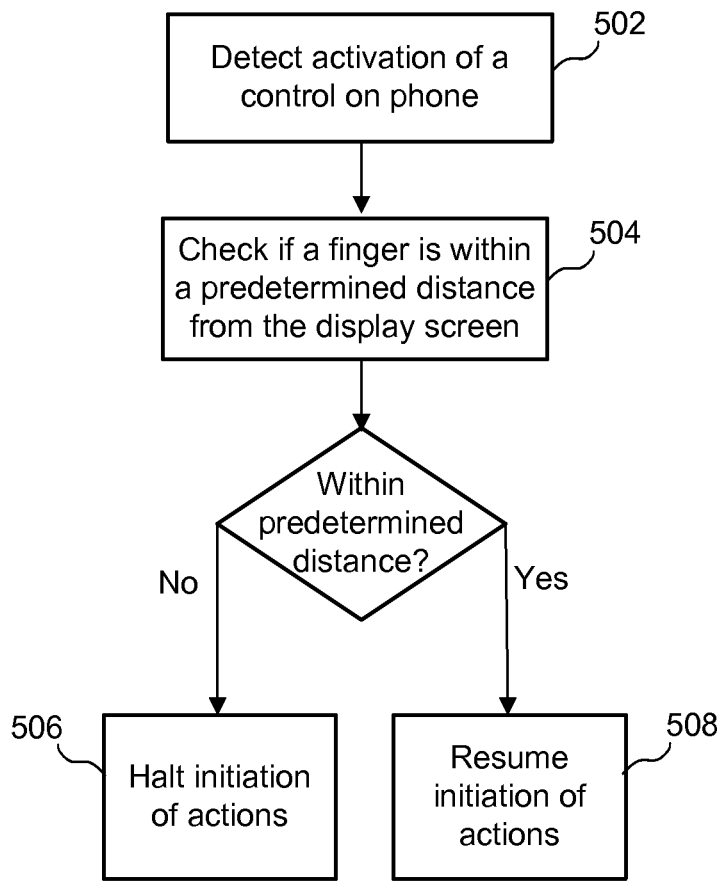
FIG. 5 illustrates an example simplified flow diagram for enhancing phone functionality based on detection of a finger of a user, according to one embodiment.

FIG. 5 illustrates an example simplified flow diagram for enhancing phone functionality based on detection of a finger of a user, according to one embodiment. Referring to both FIGS. 4 and 5, a method is initiated in block 502, where phone 400 detects an activation of a control on phone 400. In block 504, phone 400 checks if a finger is within a predetermined distance from display screen 404 prior to phone 400 initiating one or more actions associated with the activation. In various embodiments, the predetermined actions may include disconnecting a phone call, muting a phone call, putting a phone call on hold, activating a button on a phone keypad, etc. In one embodiment, the actions may include all actions associated with controls on the phone.

In one embodiment, to check for finger 402, phone 400 takes a picture prior to phone 400 initiating the one or more actions. Phone 400 then determines if the picture includes finger 402. In one embodiment, if the picture includes finger 402, phone 400 then estimates if finger 402 is within the predetermined distance. In one embodiment, the predetermined distance (e.g., 0 to 3 inches, or more, etc.) is set to a default distance that is set at the factory. In one embodiment, the user may modify the predetermined distance. The user may also modify the field of view 408 angle.

In some embodiments, phone 400 may take multiple pictures and determine if a finger is in any of the pictures. In some embodiments, phone 400 may take a video and determine if a finger is in the video.

A finger that is close to display screen 402 is indicative of the user intending to activate a control on display screen 404. If the user's finger 402 is not in front of display screen 404, it is likely that another part of the user such the user's cheek or ear inadvertently touched a button on display screen 404 and activated a control. The user would need to then correct such an inadvertent activation of a control. For example, if the user inadvertently ended a call, the user would need to reestablish the call. In one embodiment, phone 400 may determine that a finger 402 is not in front of display screen 404 if the picture is substantially dark.

As indicated above in connection with FIG. 3, a user interface 300 may display a tool bar 302 that may include finger indication 304 that indicates that a finger has been detected. The tool bar 302 may also include finger indication 306 that indicates that a button has being selected by an object other than a finger or pointing device. In one embodiment, the display of finger indication 306 may also be an indicator that one or more control icons, or the display screen, is frozen. In some embodiments, an auditory indication such as a tone or warning beep may sound in order to indicate that a control button has been selected by an object other than a finger or pointing device. In some embodiments, the auditory indication may sound in addition to or in lieu of the display of finger indication 306. In some embodiments, in addition to or in lieu of finger indication 306, tool bar 302 may display an icon or thumbnail photo of an object that has inadvertently touched a control button. For example, tool bar 302 may display an icon or thumbnail photo of the user's cheek.

In block 506, phone 400 halts the one or more actions if a finger is not within the predetermined distance from display screen 404. In other words, if the activation of a control does not coincide with the presence of the user's finger 402 in front of display screen 404, phone 400 will not perform the action. In one embodiment, phone 400 halts initiation of any action until the user initiates an action by touching a control on display screen 404 with the user's finger. In one embodiment, phone 400 may visually display that one or more buttons are frozen. For example, in one embodiment, phone 400 may highlight one or more buttons when frozen. Other visual indications in different forms are possible. For example, in another example embodiment, phone 400 may display a halo over each of one or more buttons when frozen.

If finger 402 is in front of display screen 404, the user probably intended to touch display screen 404 at that moment and touched the display screen with finger 402 in order to activate a control. In block 508, if a finger is within the predetermined distance from display screen 404, phone 400 resumes the initiation of the one or more predetermined actions.

In one embodiment, the predetermined actions are provided by a default list that is set at the factory. In one embodiment, phone 400 enables a user to select the one or more predetermined actions from a predetermined list of actions. In one embodiment, phone 400 enables a user to override the halting of one or more predetermined actions.

In various embodiments, any detection device or sensor may be used to check for the finger. For example, such a sensor can be an image sensor, an infrared sensor, etc. In such embodiments, it is not necessary that phone 400 detects a finger. It is possible for phone 400 to simply detect an object that is close to display screen 404. In one embodiment, such an object can be a stylus, pencil, pen, etc.

Figure 6:
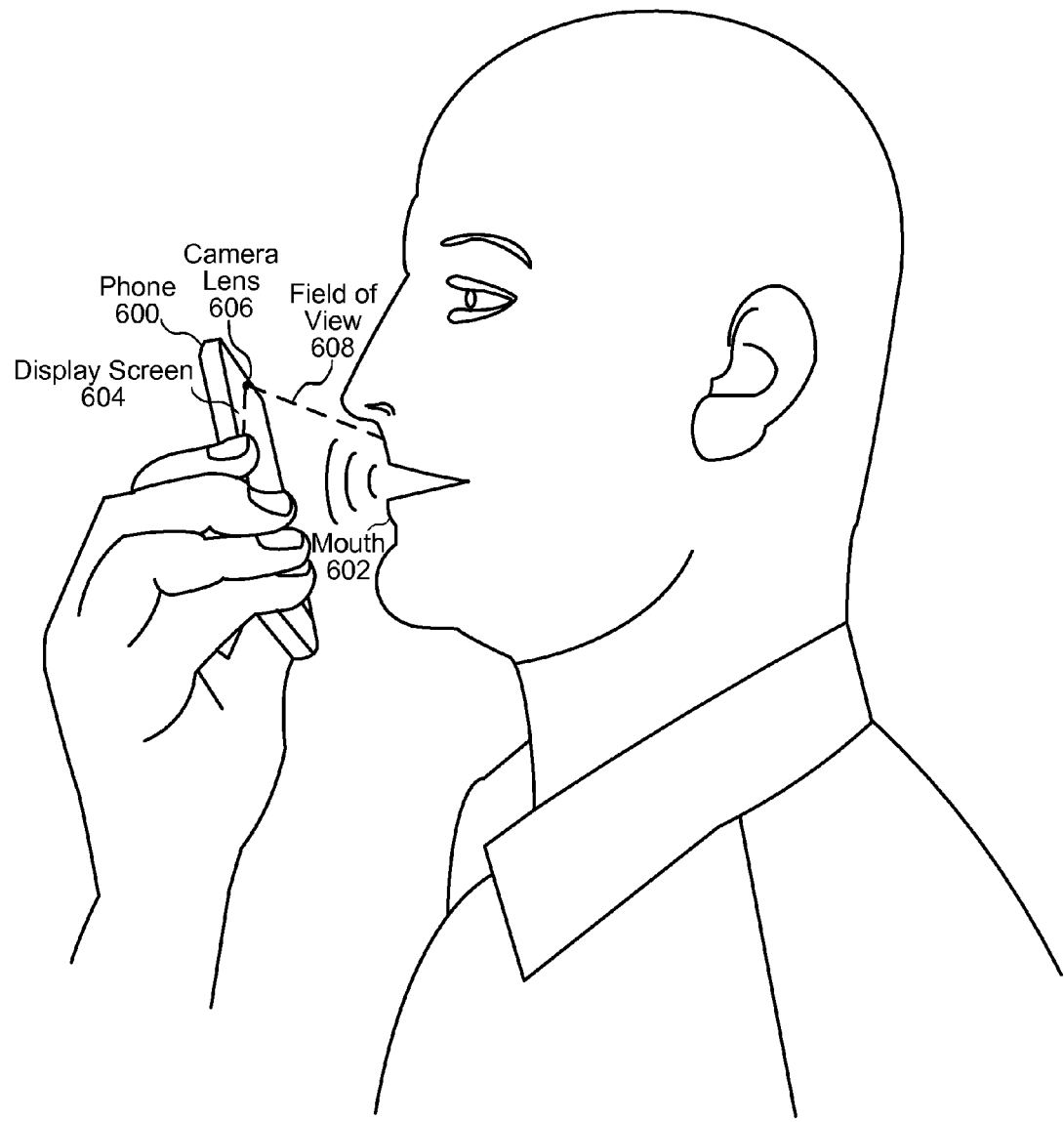
FIG. 6 illustrates a diagram of a phone that is held up to the mouth of a user, where the user is talking into the phone, according to one embodiment.

FIG. 6 illustrates a diagram of a phone 600 that is held up to the mouth 602 of a user, where the user is talking into phone 600, according to one embodiment. In one embodiment, phone 600 includes a display screen 604 and a camera lens 606 of a camera. Camera lens 606 is configured to detect objects (e.g., mouth 602) that are within a predetermined distance from display screen 604. In one embodiment, camera lens 606 may be configured with a field of view 608 that can detect mouth 602 when it is within a close proximity (e.g., 3 to 6 inches, or more) to display screen 604.

In one embodiment, camera lens 606 may be a wide angle lens that can capture an object that is anywhere in front of display screen 604. In one embodiment, camera lens 606 may be a transparent cover over an existing camera lens, where camera lens 606 alters the optics to achieve a wider field of view and closer focus. As an overlay, camera lens 606 may be a film or button placed over an existing lens to alter the optics. In one embodiment, if camera lens 606 overlays an existing camera lens, phone 600 corrects any distortions to an image that may occur. Camera lens 606 may be permanently fixed to phone 600 or temporarily fixed to phone 600. In one embodiment, camera lens 606 may be a permanent auxiliary lens on phone 600, which may be used by an existing camera or a separate dedicated camera with the purpose of detecting a user finger.

While camera lens 606 is shown in the upper center portion of phone 600, camera lens 606 may be located anywhere on the face of phone 600. Furthermore, while one lens 606 is shown, phone 600 may use multiple lenses for detection.

Figure 7:
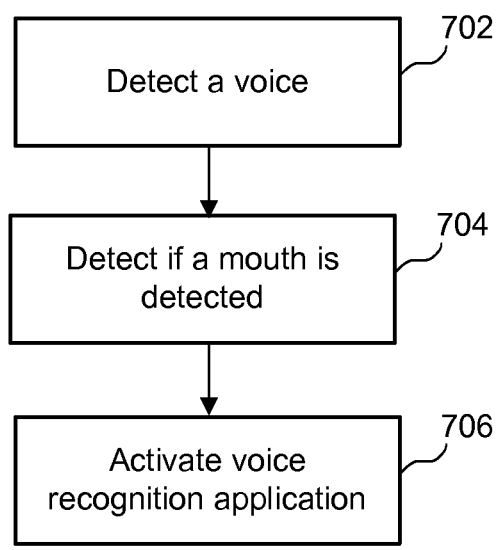
FIG. 7 illustrates an example simplified flow diagram for enhancing phone functionality based on detection of a mouth of a user, according to one embodiment.

FIG. 7 illustrates an example simplified flow diagram for enhancing phone functionality based on detection of a mouth of a user, according to one embodiment. Referring to both FIGS. 6 and 7, a method is initiated in block 702, where phone 600 detects a voice. In one embodiment, the voice includes speech. In block 704, phone 600 checks if a mouth 602 is detected. In block 706, phone 600 activates a voice recognition application on a phone if both the voice and mouth 602 are detected. In one embodiment, a face is sufficient determine that the user intends to speak into phone 600. In other words, phone 600 activates a voice recognition application on a phone if both the voice and a face are detected. The voice recognition mode can allow a user to issue a voice command. The phone can assume that if the user's mouth is close to the phone and the lips are moving and audible speech is being received then the user is talking to or on the phone. If there is no other application currently running so, for example, it is known that the user is not on a phone call, making a voice recording, etc. then it can be assumed that the user is issuing a voice command to the phone. Thus, the phone can be alerted of a voice command simply by the user speaking toward the phone (either close or one or more feet away) and the phone can accept the voice command without having the user manipulate the touch screen or other control to indicate that a voice command is being given.

In one embodiment, phone 600 activates a voice recognition application on a phone if both the voice and mouth 602 with moving lips are detected. In one embodiment, if phone 600 detects moving lips, phone 600 activates a lip reading application. In one embodiment, phone 600 may interpret commands from the user solely by voice recognition, solely by lip reading, or a combination of both voice recognition and lip reading.

In one embodiment, to detect a mouth, phone 600 takes a picture if the voice is detected. Phone 600 then determines if a mouth is in the picture. If the mouth is in the picture, phone 600 determines a distance between the mouth and the phone. In one embodiment, a mouth is determined to be detected if the mouth is within a predetermined distance from the phone. In some embodiments, phone 600 may take multiple pictures and determine if a mouth is in any of the pictures. In some embodiments, phone 600 may take a video and determine if a mouth is in the video.

In one embodiment, the predetermined distance (e.g., 0 to 12 inches, or more, etc.) is set to a default distance that is set at the factory. In one embodiment, the user may modify the predetermined distance. The user may also modify the field of view 608 angle. A face or mouth 602 that is close to display screen 602 is indicative of the user intending to speak into phone 600. For example, if the users mouth/face is within 12 inches from display screen 604, the user probably intends to speak into phone 600 to activate a control.

In one embodiment, any detection device or sensor may be used to check for a mouth. For example, such a sensor can be an image sensor, a proximity sensor, a distance sensor, an accelerometer, an infrared sensor, and an acoustic sensor, etc.

In some embodiments, phone 600 may user mouth detection in combination with eye detection. For example, in some embodiments, phone 600 may detect a mouth that is close to display screen 602 and also detect that the users eyes are reading text on the display screen.

Figure 8:
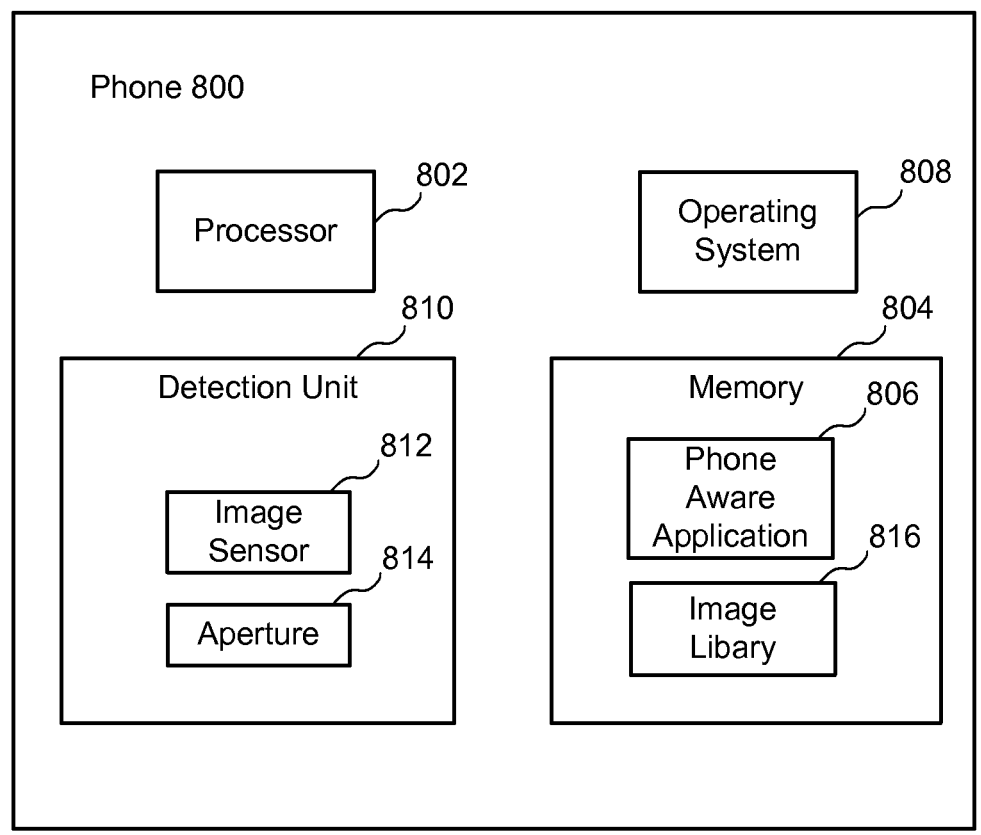
FIG. 8 illustrates a block diagram of a phone, which may be used to implement the embodiments described herein.

FIG. 8 illustrates a block diagram of a phone 800, which may be used to implement the embodiments described herein, such as phones 100, 400, and 600 described herein. In one embodiment, phone 800 may include a processor 802 and a memory 804. A phone aware application 806 may be stored on memory 804 or on any other suitable storage location or computer-readable medium. In one embodiment, memory 804 may be a non-volatile memory (e.g., random-access memory (RAM), flash memory, etc.). Phone aware application 806 provides instructions that enable processor 802 to perform the functions described herein. In one embodiment, processor 802 may include logic circuitry (not shown).

In one embodiment, phone 800 also includes a detection unit 810. In one embodiment, detection unit 810 may be a camera that includes an image sensor 812 and an aperture 814. Image sensor 812 captures images when image sensor 812 is exposed to light passing through a camera lens. Aperture 814 regulates light passing through the camera lens. In one embodiment, after detection unit 810 captures images, detection unit 810 may store the images in an image library 816 in memory 804.

In other embodiments, phone 800 may not have all of the components listed and/or may have other components instead of, or in addition to, those listed above.

The components of phone 800 shown in FIG. 8 may be implemented by one or more processors or any combination of hardware devices, as well as any combination of hardware, software, firmware, etc.

While phone 800 may be described as performing the steps as described in the embodiments herein, any suitable component or combination of components of phone 800 may perform the steps described.

Although the description has been described with respect to particular embodiments thereof, these particular embodiments are merely illustrative, and not restrictive. For example, various embodiments have been described herein in the context of a finger being detected. Embodiments described herein may also apply to other objects (e.g., stylus, pencil, pen, etc.) that a user may use to operate a touchscreen. For example, phone 100 may detect a stylus, pencil, pen, etc, similarly to phone 100 detecting finger 102. In some embodiments, a user's finger may be considered a stylus.

Although the description has been described with respect to particular embodiments thereof, these particular embodiments are merely illustrative, and not restrictive. For example, finger, features may work with a stylus or other pointing implement Although particular embodiments have been described primarily in association with a phone, it should be apparent that many other types of devices can be the subject of the various features described herein. In general, any device that provides a user interface may benefit from features of the invention. Although a camera has been used as the primary sensor, other embodiments can use any detection device or sensor may be used. For example, in various embodiments, such a sensor can be an image sensor, a proximity sensor, a distance sensor, an accelerometer, an infrared sensor, an acoustic sensor, etc. In such embodiments, it is not necessary that a phone detect a finger, a mouth, etc. It is possible for the phone to simply detect an object that is close to the display screen. In one embodiment, such an object may be a part of a hand, stylus, pencil, pen, etc.

Although the description has been described with respect to particular embodiments thereof, these particular embodiments are merely illustrative, and not restrictive.

Any suitable programming language may be used to implement the routines of particular embodiments including C, C++, Java, assembly language, etc. Different programming techniques may be employed such as procedural or object-oriented. The routines may execute on a single processing device or on multiple processors. Although the steps, operations, or computations may be presented in a specific order, the order may be changed in particular embodiments. In some particular embodiments, multiple steps shown as sequential in this specification may be performed at the same time.

Particular embodiments may be implemented in a computer-readable storage medium (also referred to as a machine-readable storage medium) for use by or in connection with an instruction execution system, apparatus, system, or device. Particular embodiments may be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms. In general, the functions of particular embodiments may be achieved by any means known in the art. Distributed, networked systems, components, and/or circuits may be used. Communication or transfer of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that is stored in a machine-readable medium to permit a computer to perform any of the methods described above.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, they are intended to cover various modifications and similar arrangements as would be apparent to those skilled in the art. Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A method comprising:
    detecting that an ear is in proximity to a portable electronic device;
    determining that an audio function is being executed on the portable electronic device; and
    accepting a signal from a touch screen on the portable electronic device to control the audio application, wherein the signal is generated at least in part by the ear touching the touch screen, wherein enabled controls for a detected ear control mode of the audio application are different from a non-ear control mode.

2. The method of claim 1, further comprising:
    using a camera on the portable electronic device to take a picture of the ear; and
    analyzing the picture to conclude that the ear is within a predetermined distance of the portable electronic device.

3. The method of claim 1, wherein the portable electronic device includes a mobile phone.

4. The method of claim 1, wherein the audio function includes a phone call.

5. The method of claim 4, wherein the control of the audio application in response to the ear touching the touch screen includes ending the phone call.

6. The method of claim 4, wherein the control of the audio application in response to the ear touching the touch screen includes muting the phone call.

7. The method of claim 1, wherein the audio function includes a radio.

8. The method of claim 7, wherein the control of the audio application in response to the ear touching the touch screen includes changing to a different radio program.

9. The method of claim 1, wherein the audio function includes audio playback.

10. The method of claim 9, wherein the control of the audio application in response to the ear touching the touch screen includes changing the audio playback to a new song.

11. The method of claim 1, wherein the signal from the touch screen is used to control an audio volume.

12. The method of claim 11, further comprising:
    adjusting the audio volume according to a hardness of pressing of the ear against the touchscreen.

13. The method of claim 11, further comprising:
    adjusting the audio volume according to a swipe of the ear against the touchscreen.

14. The method of claim 1, wherein the signal from the touch screen is used to control a channel selection.

15. An apparatus comprising: a portable electronic device;
    a digital processor included in the portable electronic device, wherein the digital processor is responsive to instructions for:
    detecting that an ear is in proximity to a portable electronic device;
    determining that an audio function is being executed on the portable electronic device; and
    accepting a signal from a touch screen on the portable electronic device to control the audio application, wherein the signal is generated at least in part by the ear touching the touch screen, wherein enabled controls for a detected ear control mode of the audio application are different from a non-ear control mode.

16. The apparatus of claim 15, wherein the instructions include:
    adjusting a volume of the audio function according to a hardness of pressing of the ear against the touchscreen.

17. The apparatus of claim 15, wherein the instructions include:
    adjusting a volume of the audio function according to a swipe of the ear against the touchscreen.

18. A processor-readable non-transitory medium including one or more instructions for:
    detecting that an ear is in proximity to a portable electronic device;
    determining that an audio function is being executed on the portable electronic device; and
    accepting a signal from a touch screen on the portable electronic device to control the audio application, wherein the signal is generated at least in part by the ear touching the touch screen,
    wherein enabled controls for a detected ear control mode of the audio application are different from a non-ear control mode.

19. The processor-readable non-transitory medium of claim 18, wherein the one or more instructions includes:
    adjusting a volume of the audio function according to a hardness of pressing of the ear against the touchscreen.

20. The processor-readable non-transitory medium of claim 18, wherein the one or more instructions includes:
    adjusting a volume of the audio function according to a swipe of the ear against the touchscreen.

* * * * *